May 5, 1953  R. E. SWISHER  2,637,252
BOX ASSEMBLY MACHINE
Filed Jan. 14, 1950  9 Sheets-Sheet 1
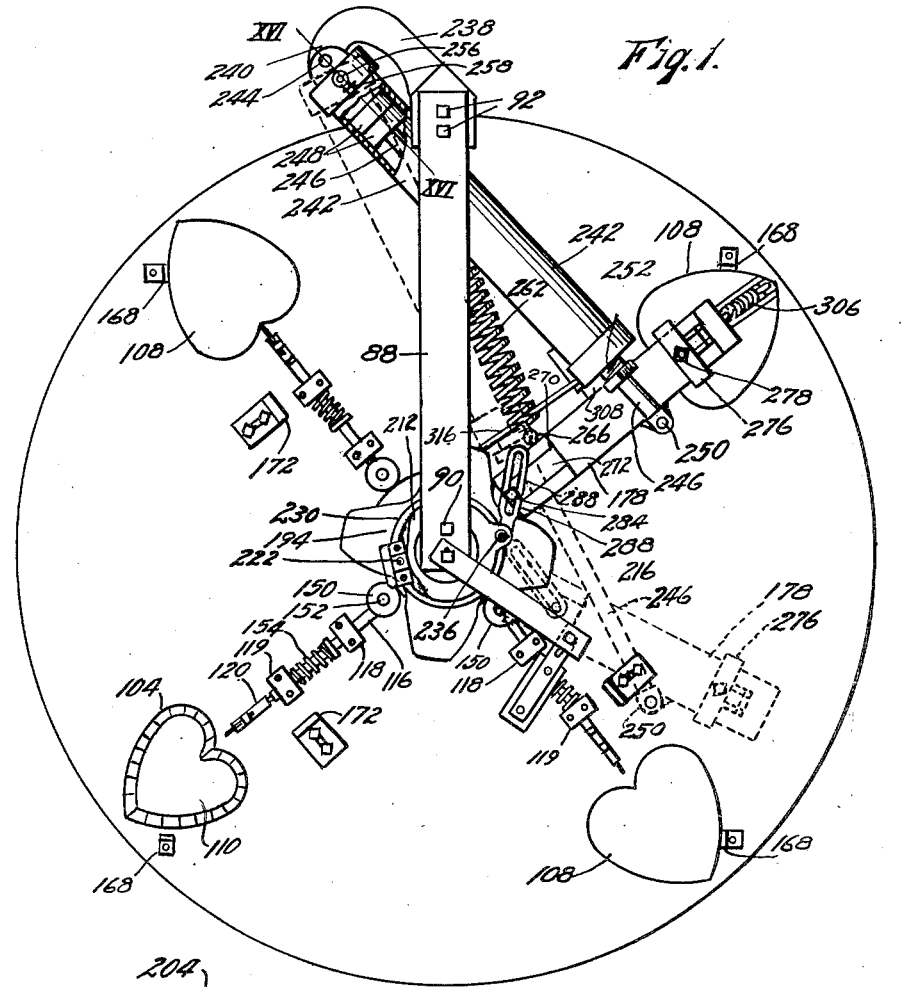
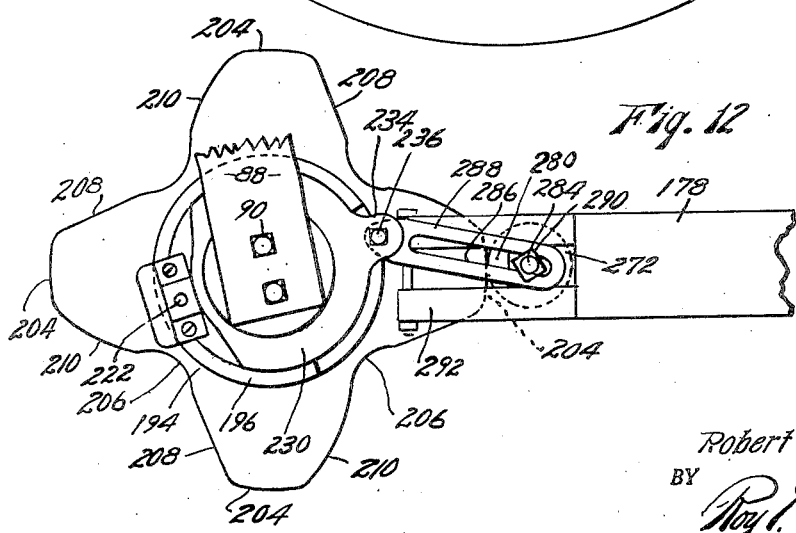
INVENTOR,
Robert E. Swisher.
BY Roy E. Hamilton,
Attorney.

May 5, 1953 R. E. SWISHER 2,637,252
BOX ASSEMBLY MACHINE
Filed Jan. 14, 1950 9 Sheets-Sheet 2
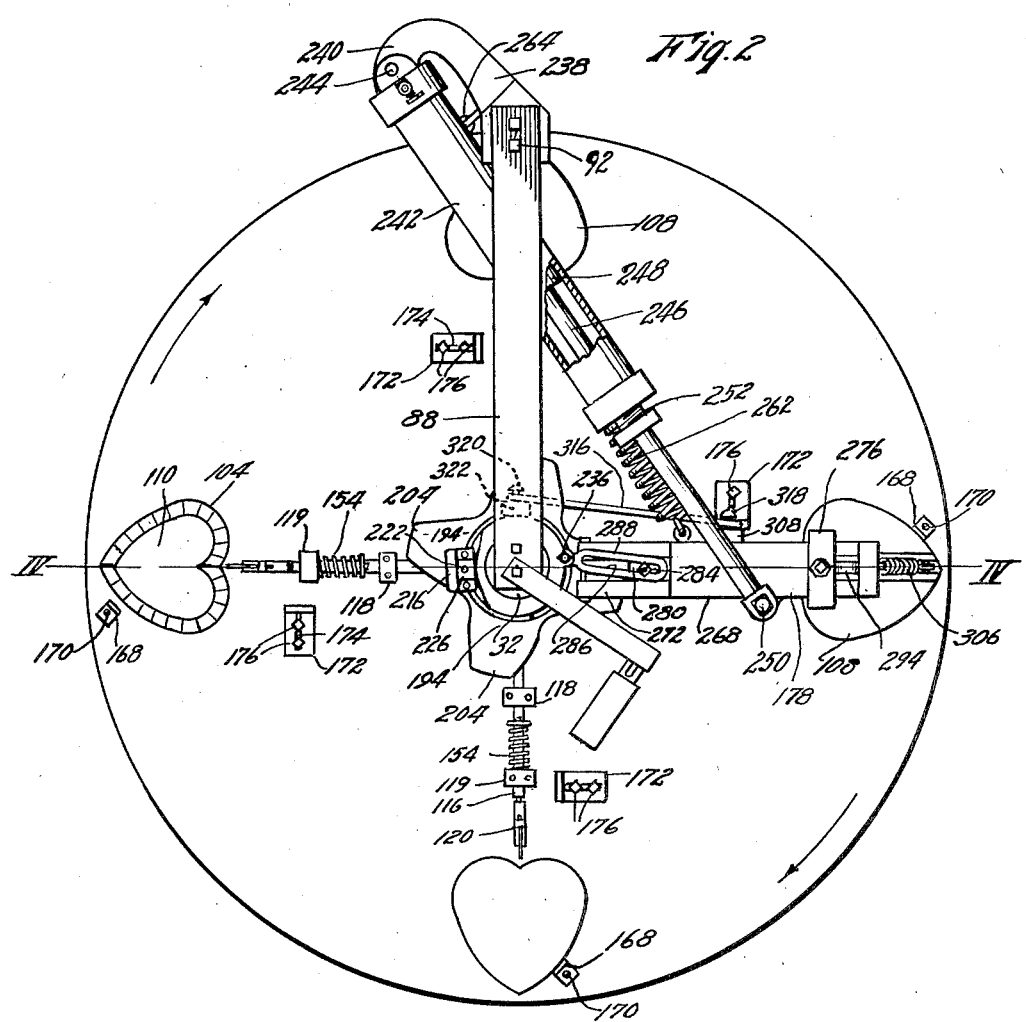
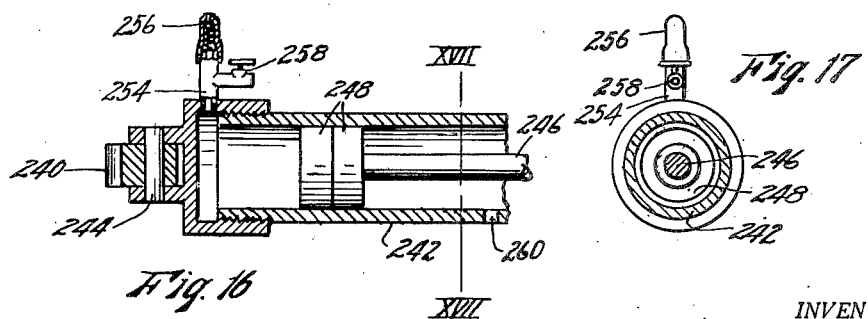
INVENTOR,
Robert E. Swisher,
BY Roy E. Hamilton,
Attorney.

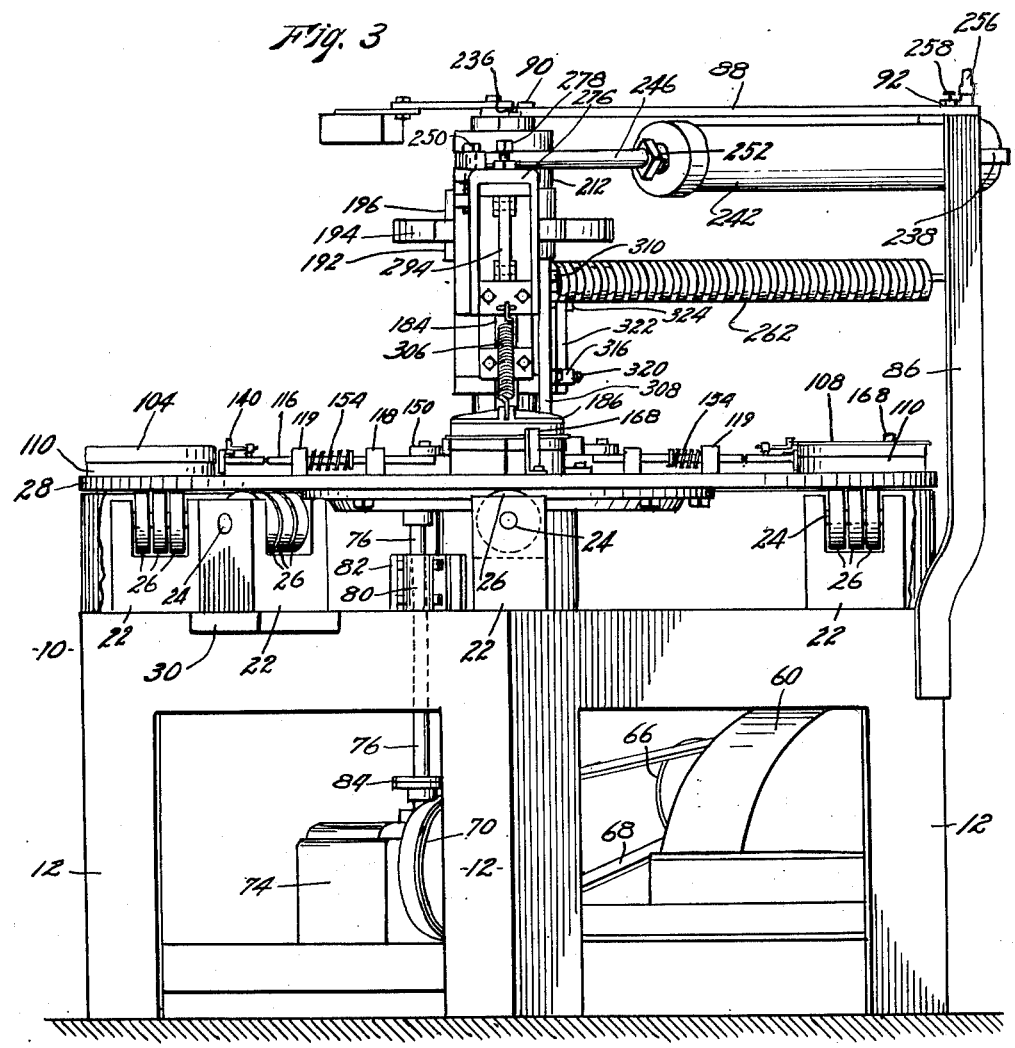

May 5, 1953 — R. E. SWISHER — 2,637,252
BOX ASSEMBLY MACHINE
Filed Jan. 14, 1950 — 9 Sheets-Sheet 4

INVENTOR,
Robert E. Swisher.
BY Roy C. Hamilton.
Attorney.

May 5, 1953 R. E. SWISHER 2,637,252
BOX ASSEMBLY MACHINE
Filed Jan. 14, 1950 9 Sheets-Sheet 5

INVENTOR,
Robert E. Swisher.
BY Royal E. Hamilton,
Attorney.

May 5, 1953  R. E. SWISHER  2,637,252
BOX ASSEMBLY MACHINE
Filed Jan. 14, 1950  9 Sheets-Sheet 6
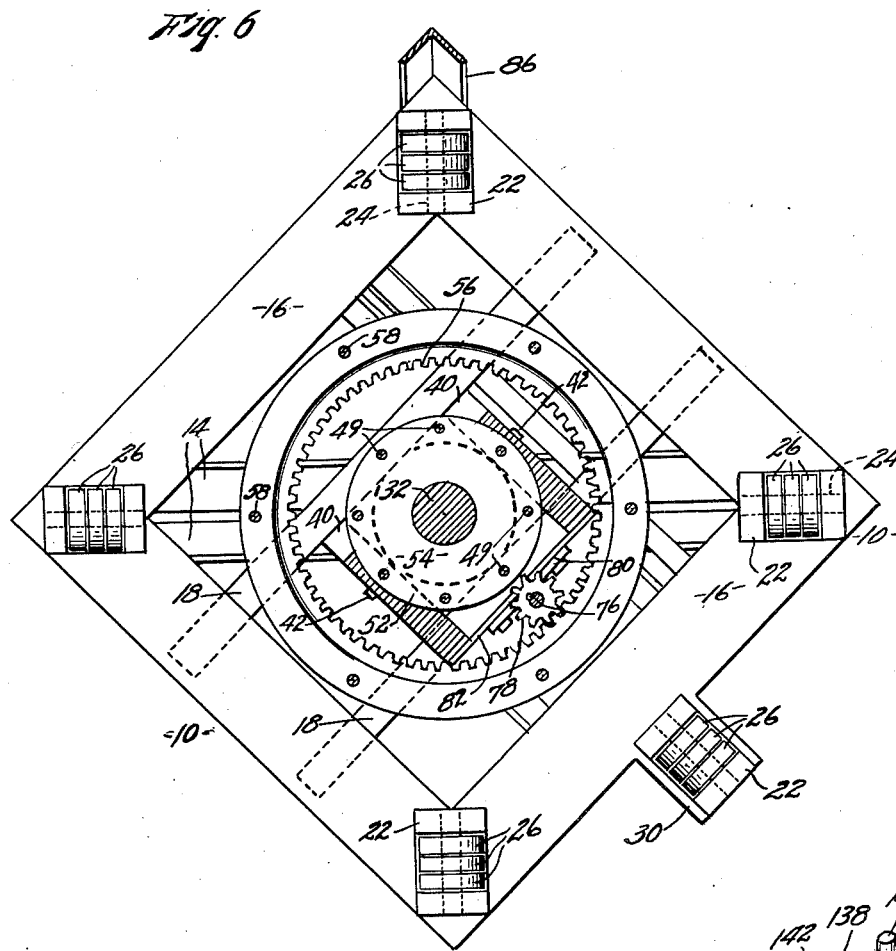
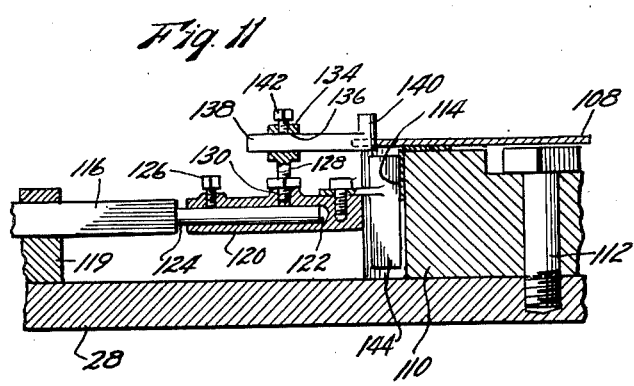
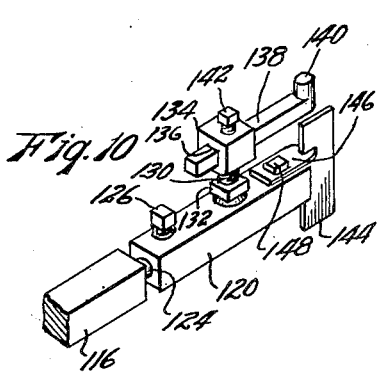
INVENTOR,
Robert E. Swisher.
BY Roy E. Hamilton,
Attorney.

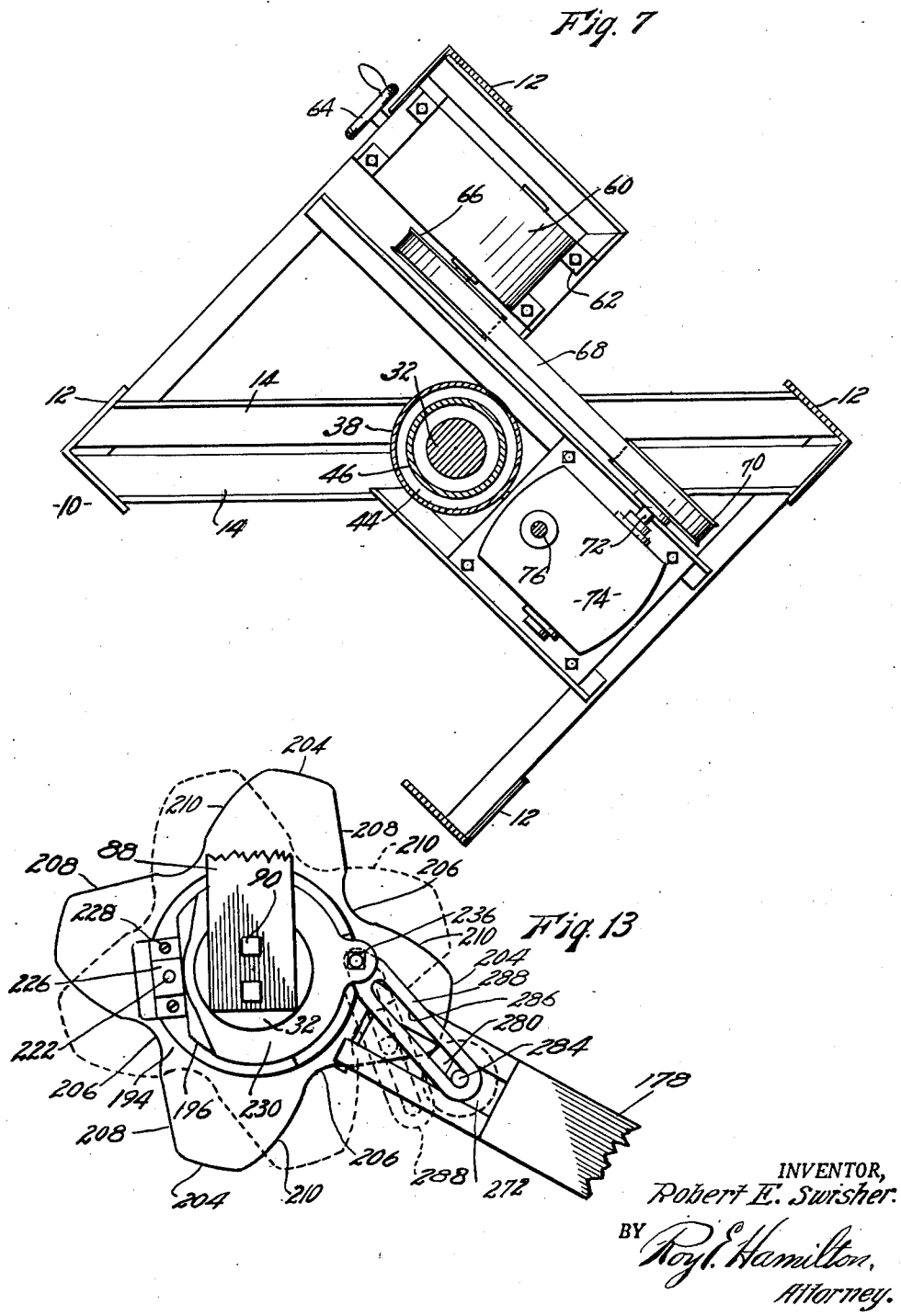

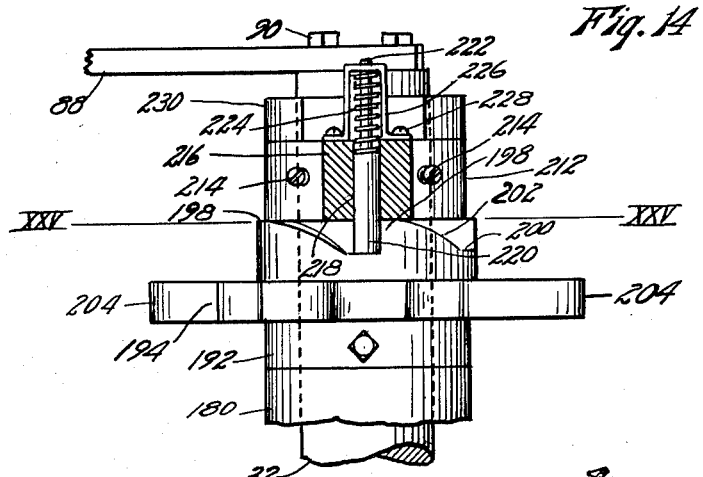
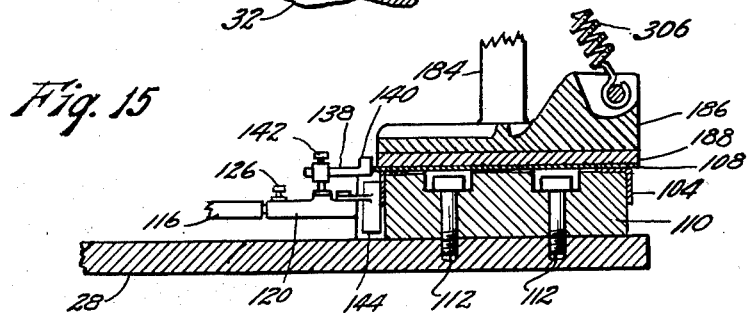
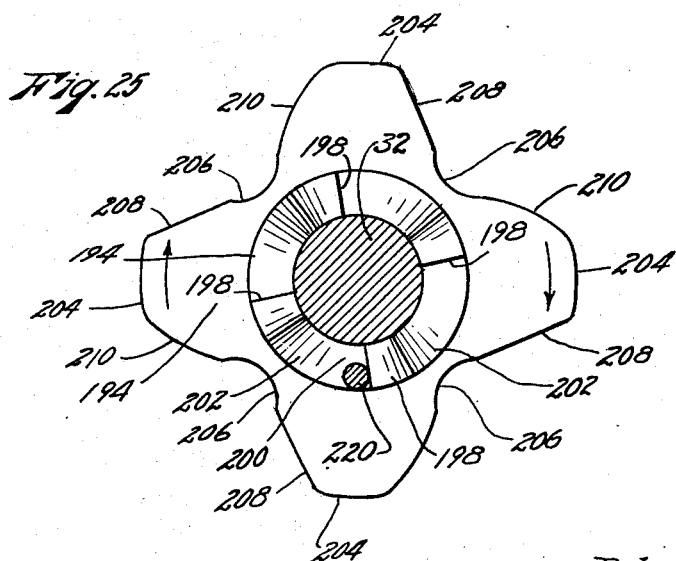

May 5, 1953  R. E. SWISHER  2,637,252
BOX ASSEMBLY MACHINE
Filed Jan. 14, 1950  9 Sheets-Sheet 9
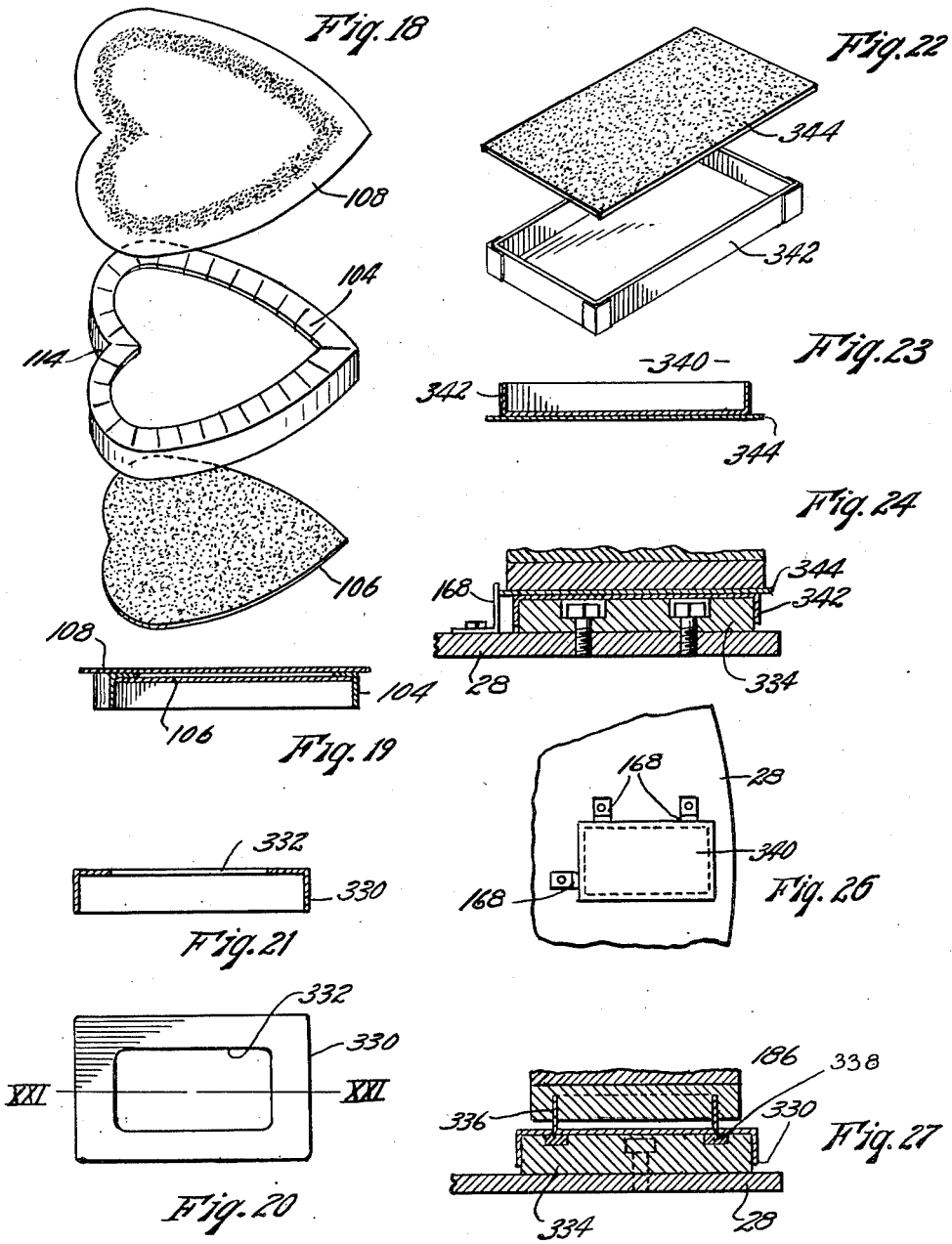
INVENTOR,
Robert E. Swisher
BY Roy E. Hamilton,
Attorney.

Patented May 5, 1953

2,637,252

UNITED STATES PATENT OFFICE 2,637,252

BOX ASSEMBLY MACHINE

Robert E. Swisher, Kansas City, Mo., assignor to Robert E. Swisher, Charles C. Cockrell, and Earl L. Cossairt, all of Kansas City, Mo.

Application January 14, 1950, Serial No. 138,665

5 Claims. (Cl. 93—55)

This invention relates to improvements in box assembly machines and particularly to machines adaptable for use in the assembly of flanged boxes and specifically for heart shaped flanged candy boxes.

The present method of producing these heart shaped candy boxes is very slow and tedious, thus making them quite expensive, due principally to the labor cost. The present machine is designed and constructed to produce a predetermined number of boxes per hour when operated at a given constant speed. Furthermore, when producing less complicated boxes the speed may be varied to produce the product at a higher rate of speed.

The principal object of the present invention is the provision of a box assembly machine comprising a frame including a vertically disposed standard, carrying a work table for horizontal rotation, a series of base forms carried by said table in peripherally spaced relation about said standard, an operating cam mounted for rotation on said standard and having a ratcheted hub, a stop pin adjustably secured to said standard and adapted to engage said ratcheted hub to hold said cam against rotation with said table, an arm rotatably mounted for oscillation on said standard and carrying a packer at its outer end, driving means operable by said rotating table to cause said cam to move said packer to selectively engage work on one of said base forms, and means associated with said driving means and operable by said rotating table to release said driving means and cause said arm to move to its starting point to engage the work positioned on the next succeeding base form.

Another object of this invention is the provision of a box assembly machine suitable for assembling and gluing flanged boxes of various forms and shapes, or for assembling substantially any boxes requiring the gluing together of box parts.

Other objects are simplicity and economy of construction, ease and efficiency of operation and adaptability for use for any operation requiring a press operation.

With these objects in view, as well as other objects which will appear during the course of the specification, reference will be had to the drawings wherein:

Figure 1 is a top plan view of the box assembly machine with the parts in the registered relation to start the sealing operation and embodying this invention.

Figure 2 is a view similar to Fig. 1 with parts moved forward to the pressure applying stroke and with parts broken away.

Figure 3 is a side elevation of the machine with the operating parts in the position shown in Fig. 2.

Figure 6 is a horizontal sectional view taken on line VI—VI of Figure 4.

Figure 7 is a horizontal sectional view taken on line VII—VII of Fig. 4.

Figure 10 is an enlarged detached perspective view of the outer end portion of the box forming arm shown in Fig. 9.

Figure 11 is an enlarged fragmentary sectional view of the box forming arm shown in Fig. 9.

Figure 12 is an enlarged plan view of the operating cam and its associated parts positioned in the compression stroke.

Figure 13 is an enlarged plan view of the operating cam and associated parts at the end of the compression stroke, and with the cam shown in retracted position in dotted lines.

Figure 14 is an enlarged elevational view of the upper end portion of the center standard with associated parts and with parts broken away to show the clutch structure.

Figure 15 is a sectional view of a portion of the parts shown in Fig. 9 with the pressure foot in position thereon.

Figure 16 is an enlarged sectional view taken on line XVI—XVI of Fig. 1.

Figure 17 is a cross-sectional view taken on line XVII—XVII of Fig. 16.

Figure 18 is a disassembled view of the parts that make up a heart-shaped box cover.

Figure 19 is a sectional view of an assembled heart-shaped box cover.

Figure 20 is a plan view of a plain box cover leaving a cut-out window.

Figure 21 is a sectional view taken on line XXI—XXI of Fig. 20.

Figure 22 is a separated view of the parts of a rectangular flanged box or box lid.

Figure 23 shows the box parts shown in Fig. 22 in assembled relation.

Figure 24 shows the box parts shown in Fig. 22 in position in the machine for forming.

Figure 25 is a sectional view taken on line XXV—XXV of Fig. 14.

Figure 26 is a modified form of the table structure with the work held in position by means of three detents.

Figure 27 is a modified form of the base form adapted to serve as a cutting base to receive a cutter to form windows in box cover members.

Figure 4:
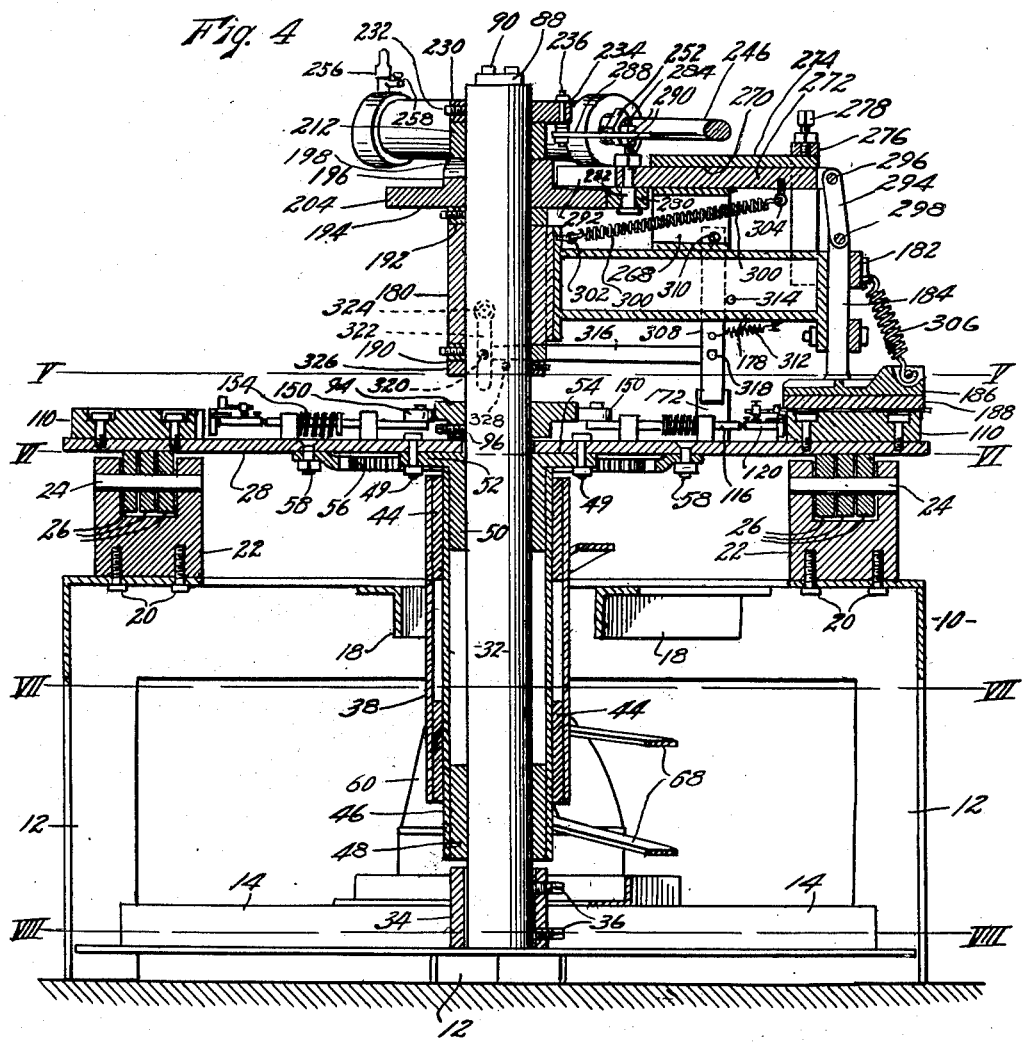
Figure 4 is a vertical sectional view taken on line IV—IV of Fig. 2.
Figure 8:
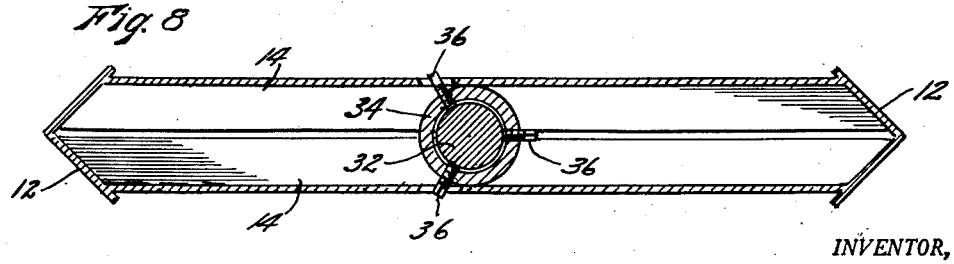
Figure 8 is a horizontal section taken on line VIII—VIII of Fig. 4.

Throughout the several views like numerals designate similar parts and the numeral 10 designates a frame of substantially rectangular open form and having corner legs 12, diagonally disposed lower cross members 14, a substantially horizontally positioned marginal top plate 16, and top cross bars 18. Securely mounted on table plate 16 by means of machine screws 20 adjacent the rectangular corners is a bearing block 22 each of said blocks carrying a radially disposed bearing shaft 24 upon which is rotatably mounted a series of rollers 26 which serve as bearings for a rotatably mounted planar table plate 28. Top plate 16 is provided along one side with an extension 30 which serves to support another bearing block 22 which also carries a radially disposed shaft 24 on which is rotatably mounted a like series of rollers 26. Corresponding rollers of all of said series are spaced at like radial distances from the center of rotation of said table plate 28.

The main center standard 32 comprises a shaft mounted in a relatively large tubular socket 34 welded to cross members 14 and provided with a series of radially spaced-apart set screws 36, whereby the lower end of standard 32 is adjustable to maintain it in proper alignment with the frame 10. A sleeve 38 centrally secured in position between cross bars 18 and transverse bars 40 is secured against rotation by set screw 42 and serves to secure standard 32 firmly in its central position in relation to frame 10. This sleeve 38 extends above the frame to a point adjacent the under surface of table plate 28 and is provided at its opposite end portions with internal bushings 44 which in turn support an elongated sleeve 46 having a snugly fitted bushing 48 which snugly fits standard 32 to hold the parts in proper relation. The upper end of sleeve 46 is provided with a bushing 50, having a flanged head 52, having a planar face 54, which is tightly secured to the lower surface of table plate 28 by bolts 49 to secure it with said table plate upper planar surface in perpendicular relation to the axis of standard 32. With this mounting of the table plate it is apparent that by proper setting of set screws 36 the plate 28 may be properly adjusted to rest on rollers 26. Mounted on said table plate concentrically with the axis of standard 32 is an internal spur gear 56 which is secured in position by bolts 58.

Means for rotating table 32 comprises a variable speed motor 60 mounted on movable base 62, and operable by hand wheel 64. Belt wheel 66 is driven by motor 60 and operatively connected by belt 68 with belt wheel 70 mounted on drive shaft 72 of the speed reducing means 74. This speed reducing means has a driven shaft 76 which is provided at its upper extremity with spur pinion 78 which intermeshes with internal gear 56 to rotate table 28 in the direction indicated by the arrows. A bearing 80 mounted on plate 82 serves to support shaft 76 adjacent pinion 78. Plate 82 is secured to cross bar 18 by welding. Shaft 76 is split and provided with a suitable connector 84 to permit slight relative movements as the standard 32 is being adjusted as above set forth.

An angle member 86 secured to frame 10 by welding extends above said frame a distance equal to the height of standard 32 and is connected thereto by means of a bar 88 secured at its opposite ends to standard 32 and angled member 86 by screws 90 and 92, respectively. Bar 88 is disposed on a radial line and thus serves to stabilize the standard 32 and secure it against accidental movement.

Figure 5:
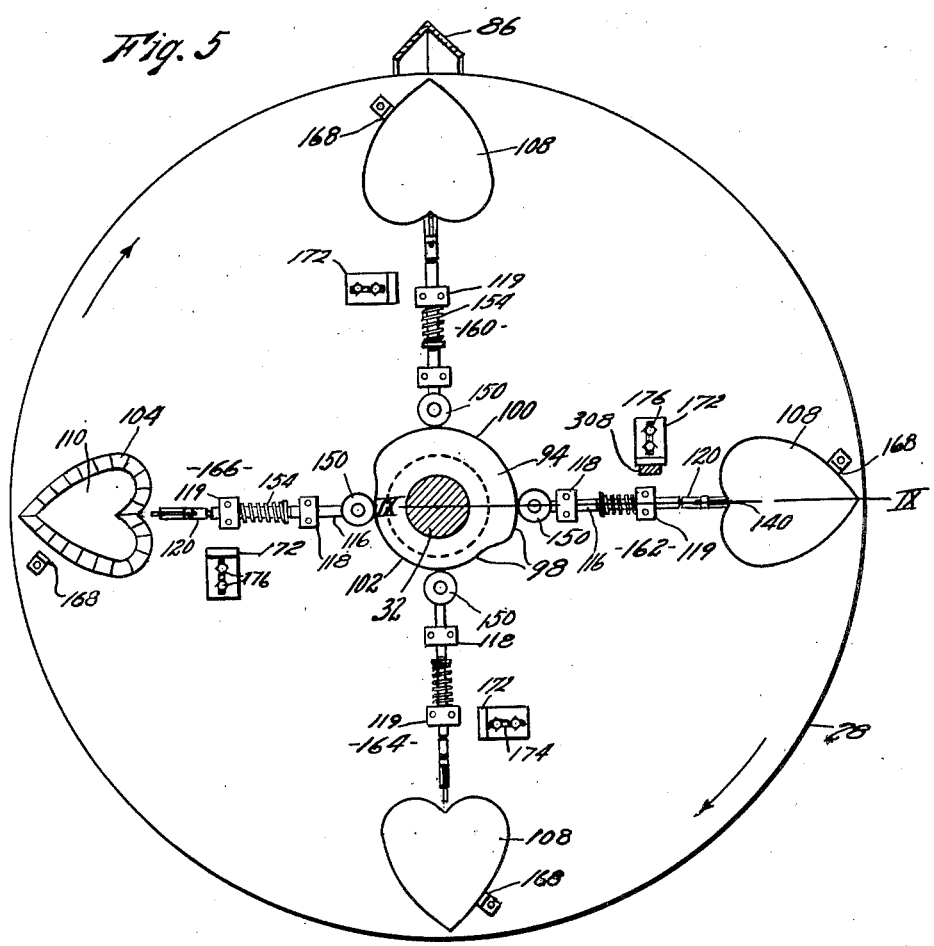
Figure 5 is a horizontal sectional view taken on line V—V of Fig. 4.

Referring to Figs. 4 and 5 it will be noted that a cam 94 is adjustably mounted on standard 32 by means of set screw 96, in slightly spaced-apart relation above table plate 28. The cam face 98 can be made of any suitable form to perform the desired movements of the movable parts. In the present showing the cam is made with a circular high section 100 and a relatively low circular section 102 which remain stationary as the table plate is rotated, thus completing a complete action of the cam at each full rotation of the table plate.

This machine is constructed to carry out various operations in the manufacture and assembly of various types of cardboard boxes such as flanged boxes, heart-shaped flanged boxes, windowed boxes, etc. The present showing provides for a machine best suited to make heart-shaped candy boxes which are perhaps among the most difficult to assemble and glue. The construction of this box is best shown in Figs. 18 and 19, wherein body members 104, 106 and top member 108 are preformed for positioning on the machine as hereinafter set forth.

In the assembly of the heart-shaped boxes, a plurality of base forms 110 of substantially heart shape are secured at substantially equally spaced-apart distances to the marginal top surface of planar table plate 28, by means of screws 112. The screws are countersunk into the top surface of form 110 so as to present a smooth top surface for receiving the flat box parts. These basic forms are disposed lengthwise on radial lines with the point of the heart at the extreme distance from the center of table 28, thus presenting the heart crease 114 in alignment with its respective radial line.

Figure 9:
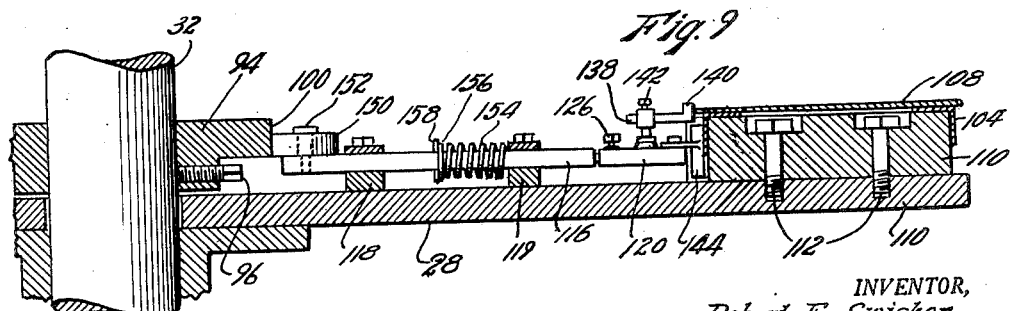
Figure 9 is an enlarged sectional view taken on line IX—IX of Fig. 5.

Referring to Figs. 9, 10 and 11, which best show the construction of the parts operable by cam 94, it will be noted that adjustable bar 116 is slidably mounted in blocks 118 and 119 rigidly fixed to the top surface of table plate 28. Bar 116 is provided with an end member 120 which is bored at 122 to receive the rounded end portion 124 of bar 116. A set screw 126 mounted in end member 120 serves to engage and secure this end member in adjusted position on the rounded end position 124 of bar 116.

End member 120 is provided on its top side with a vertical standard 128 which is adjustably threaded into the end member at 130 and provided with a set nut 132 and head 134 having a transverse opening 136 formed therethrough to receive a bar 138 having a head 140 which serves to contact and position the top member 108. The set screw 142 mounted in head 34 serves to secure the bar in a fixed adjusted position to properly position top member 108.

End bar member 120 is also provided with an outwardly projecting blade 144 which is mounted beyond the outer end of member 120 on a bar 146 which extends over member 120 and is secured thereto by means of screw 148. This blade is adapted to be adjusted to engage the heart crease 114 of the body member 104 to hold it in proper form about base form 110 during the sealing operation. The inner end of bar 116 is provided with a horizontally disposed, rotatably mounted roller 150 secured for rotation by shouldered screw 152. This roller 150 is held in operative relation with cam 94 by means of a compressed spring 154 mounted on bar 116 with its one end resting on the inner face of block 119 and with its other end positioned against a washer 156 secured against inward movement on rod 116 by means of a key 158 passing therethrough. This key 158 is always spaced outwardly from block 118 so that the roller will always be urged against the face of cam 94.

There are four like sets of pusher bars, just described, which are shown spaced apart at regular intervals of 90° (degrees) and for convenience of identification will be numbered as 160, 162, 164 and 166 clockwise about the table plate in the direction of rotation.

A further detent 168 is secured by screw 170 to table plate 28 in spaced relation to each base form 110 to extend thereabove to serve as a back stop for top member 108 before pressure is exerted to bind the glued box parts together, as hereinafter described.

To the rear of each of said pusher arm assembly is an adjustably mounted driving block 172, slotted at 174 and secured to table plate 28 by screws 176. These screws are adapted to be set to secure the driving block tightly to the table plate and serve to oscillate pressure arm 178 through predetermined degrees as the table plate is rotated at a substantially uniform rate of speed in one direction.

A pressure arm 178 is mounted on a hub 180 rotatably carried on standard 32 and is provided with a carriage 182 suitable for supporting a vertically slidable bar 184 carrying a pressure foot member 186 having a planar pressure plate 188 of a suitable shape to cooperate with base form 110 to properly press the box parts together. Hub 180 is secured against longitudinal movement on standard 32 by lower set collar 190 and upper set collar 192. Mounted rotatably above standard 32 on set collar 192 is a lobed operating cam member 194 having a ratcheted, integral hub 196 having four equally spaced ratchet teeth 198 and four ratchet notches 200 with inclined walls 202 formed in its outer face. Cam member 194 is provided with four equally spaced lobes 204 terminating at their bases in arcuate recesses 206 and each having a substantially planar forward face 208 and convex rear face 210.

Positioned on standard 32 directly above the ratchet hub 196 is an adjustable set collar 212 adapted to be adjustably fixed to standard 32 by means of set screw 214. This collar 212 is provided with a side lug 216, recessed at 218 to receive a vertically movable stop pin 220 having a reduced upper end portion 222 adapted to receive a compression spring 224 which bears against a U-shaped bracket 226 secured on the top side of set collar 212 by screws 228.

Adjustably mounted on standard 32 just above set collar 212 is a collar 230 which is adapted to be secured in fixed relation to said standard by means of set screw 232, and has a peripheral boss 234 which serves to receive a vertically disposed bearing pin 236 which carries parts hereinafter described.

Securely fixed adjacent the top portion of member 86 is a bracket 238 having a curved neck 240 to which is pivotally secured the rearward end of cylinder 242 by means of a pin 244. Mounted in cylinder 242 on a piston rod 246 is a piston head 248 which is adapted to move in the piston to regulate the speed of travel of pressure arm 178 to which the outer end of said piston rod is pivoted by means of pin 250. Cylinder 242 is provided at its forward end with a stuffing box 252 through which the piston rod 246 works. Mounted in the rearward end portion of cylinder 242 and communicating therewith is a valve stem 254 having a click valve 256 at its outer end to admit air into the cylinder 242 when the piston is on its outward stroke to close when the piston is on its inward stroke.

Mounted in valve stem 254 below the click valve is a pet cock 258 which can be set to permit a free flow of air to and from cylinder 242. This pet cock is adjusted to regulate the speed of travel of the piston at the end of its stroke. A hole 260 drilled through the side wall of cylinder 242 is of sufficient size to permit a free flow of air to and from the cylinder during a portion of the stroke of the piston head in the cylinder.

A helical spring 262 is secured at its one end 264 to member 86 and at its other end to an eye 266 which is secured to pressure arm 178. This spring is adapted to be tensioned as the arm 178 is moved away from member 86 during the operation of the machine and serves to return the arm 178 to the starting point adjacent member 86.

Referring to Figs. 1, 2, 3 and 4, it will be noted that arm 178 is provided on its top side with bearing block 268 having a horizontally disposed opening 270 formed therethrough to receive slidably the operating bar 272. The top portion of block 268 extends outwardly from the block 274 to rest on top of bar 272. A yoke 276 secured at its free ends to member 178 extends over extension 274 and is provided with a set screw 278 which can be adjusted to properly position bar 272.

Bar 272 extends adjacent cam member 194 and is provided on its lower side with a roller 280 mounted on bearing bolt 282. This roller is positioned to engage the cam surfaces of cam member 194 and bearing bolt 282 has a reduced threaded upper end 284 which extends through a slot 286 formed through safety link 288 which is pivoted at its one end to bearing pin 236. Nuts 290 adjustably mounted serve to properly position safety link 288 on said bolt at 284.

It will be noted that inwardly projecting portions 292 of bearing block 268 overlap the cam member 194 to serve as guides for the operating bar 272 when it is on its inward stroke.

A link 294 pivoted at its one end at 296 to the outer end of bar 272 is hinged at its other end by pin 298 to top end of vertical bar 184. When the bar 272 is urged outward by cam 194 as hereinafter described, a tension spring 300 secured at its inner end to eyelet 302 mounted in hub 180 and at its other end to an eyelet 304 mounted in the lower side of bar 272 is extended. This spring is tensioned as the bar 272 is moved outwardly, thus energizing it sufficiently to urge the bar 272 inwardly after the pressing operation is complete. A helical spring 306 secured at its one end to carriage 182 and at its other end to foot member 186 serves to lift the foot member to facilitate the toggle action of this pressure transmitting means.

The means for driving the pressure foot member 186 in unison with the rotation of table 28 during the pressing operation comprises a driving arm 308 pivoted to block 268 by pin 310 with its lower end portion normally positioned in the path of travel of driving blocks 172. A spring 312 secured at its one end to arm 308 and at its other end to arm 178 serves to normally urge arm 308 against stop pin 314. A connecting bar 316 is loosely connected at its outer end to driving arm 308 by pin 318 and at its inner end by pin 320 to a depending arm 322 pivoted at its upper end by pivot 324 to hub 180. A set collar 326 mounted on standard 32 is provided with a stop pin 328 which serves to limit the rotary movement of the lower end of arm 322 whereby the driving arm 308 is caused to be disengaged from driving block 172 whereby the arm 178 is returned to the starting point by means of spring 262.

The operation of the machine in general is as follows: Motor 60 is energized to drive the table 28 in a clockwise direction at a suitable speed of travel. The operators positioned about the machine place the box parts on the base forms 110 and remove the completed box units from the forms. Fig. 1 shows a plan view of machine with the parts in the normal starting position shown in solid lines. When so positioned the pressure foot member 186 is in registered relation with the base form 110 and the driving block 172 is in operative engagement with driving arm 308, so that the parts will be moved together. When in this position the cam member 194 is secured against rotation by stop pin 220 so that as arm 178 is rotated roller 280 will be forced to travel up curved rear face 210 and onto the top surface of lobe 204. This action will cause the pressure foot 186 to be forced tightly against the work positioned on base form 110, as shown in Fig. 4. The type of box being formed in the machine is the one shown in Figs. 18 and 19, wherein the parts 104 and 108 are partially formed and positioned on the suitable base form 110. When desired a stiffening insert 106 may be used.

Prior to placing the parts on the form 110, a coat of adhesive is applied to the parts 106 and 108 as shown in Fig. 18. When the pressure is applied in the manner just described, the parts will readily adhere to form a very durable box member. The flanged heart-shaped box shown in Fig. 19 is necessarily made of two similar parts—a top and a box section, adapted to be telescoped together thus requiring only a slight difference in the size of forms 110 and the adjustment of the gauges to properly position the parts to form a neat looking box.

The pressing operation starts as soon as the roller 280 has moved up incline 210 and onto the concentric section 204 of cam as shown in Fig. 2. Referring to Fig. 12, it will be noted that the roller 280 is shown in about the center of its packing stroke. In Fig. 13 the parts are shown with the roller 280 at the end of its pressing stroke and with the reduced end portion 234 of bearing bolt position in slot 286 at its outer extremity whereby the rotation of arm 178 with table 28 will be retarded. Just as this point is reached the driving arm 308 will disengage from driving block 172 when arm 322 engages stop pin 328 to secure it against further swinging action so that arm 308 will be moved from in front of block 172. During this rotary movement of 178 the spring 262 has been extended and energized sufficiently to return said arm to its starting point as shown in solid lines in Fig. 1. Also spring 300 which has been extended will exert a force to move roller 280 radially along the inclined forward face 203 of cam lobe to rotate the cam in an anti-clockwise direction away from stop pin 220 and into recess 206, thus raising pressure foot member 186 from the work. With roller 280 positioned in recess 206 and with spring 262 energized the arm 178 will be returned to its normal starting position with the cam moving anti-clockwise therewith so that stationary stop pin 220 will drop into the next ratchet tooth 198. As the table 28 is still rotating clockwise the driving arm 308 will be moved against pin 314 to the operating position in the path of travel of the driving block 172 so the next succeeding base form 110 with the work mounted for the pressing operation. To control the return stroke by the action of spring 262 the controls for cylinder 242 are properly adjusted to regulate the speed of travel of the piston 248 and to cushion it at the end of its stroke. The cam 94, best shown in Fig. 5, is so positioned on standard 32 as to properly position and support the box parts during the gluing operation. The parts of this positioning mechanism caused by table 28 rotate about the cam 94 so that at each revolution the complete operation is repeated, and four of the units will be produced.

Referring to Figs. 20, 21 and 27 it will be noted that the box cover 330 is of rectangular form and so provided with a cutout window 332. This window is formed on base form 334 by cutting die 336 which is carried by pressure foot member 186. A soft metal insert 338 is positioned in base form 334 to receive the cutting edge of the cutting blade to prevent dulling.

The plain flanged box 340 comprises a box member 342 having a glued-on bottom plate 344, which extends outwardly from member 342 to present a flange, see Figs. 22 and 23.

Fig. 24 shows the box parts in position in the machine for gluing with a detent 168 at its inside edge.

A modified form of positioning the box parts is shown in Fig. 26 wherein three detents 168 are used for properly spacing the bottom member 344 on the base form.

It is apparent that many forms of boxes might be assembled by this machine as well as numerous types of operations pertaining to the art of box forming and assembling are adapted to be carried on by this machine by proper adjustment of the parts.

I claim:

1. A box assembly machine comprising a fixed vertical standard, a horizontal table carried concentrically on said standard for rotation thereabout, means for rotating said table continuously in one direction, a series of work receiving forms fixed on said table in peripherally spaced relation, an arm carried for axial oscillation on said standard above said table and extending radially thereto, a pressure foot carried for vertical movement at the outer end of said arm, a spring urging said arm pivotally in a direction reverse to the rotation of said table, a releasable driving connection between said table and said arm whereby said arm is turned in the direction of rotation of said table with said pressure foot in registered relation above any one of said work receiving forms, a cam carried on said standard and secured against rotating in the direction of said table, a cam follower carried by said arm and operable by said cam, means operable by said cam follower to urge said pressure foot downwardly against said form as said arm turns with said table, and means operable by the rotation of said table for simultaneously elevating said pressure foot and releasing the driving connection to said arm, whereupon said spring returns said arm to its original position for a like operation relative to the next following form.

2. A box assembly machine comprising a frame, a rotatable table carried by said frame, means for rotating said table in one direction, a plurality of work receiving forms carried by said table in peripherally spaced relation, an arm carried by said frame for oscillation coaxially with said table, said arm being disposed above and radially relative to said table, a pressure foot carried for vertical movement at the free end of said arm, a releasable driving connection to said arm whereby said arm is caused to turn with said table through a partial revolution with said pressure foot in registered relation above one of said forms, means operable by the rotation of said table as said arm turns therewith to move said foot downwardly against said form, means operable by the rotation of said table to simultaneously elevate said foot and release the driving connections to said arm, and resilient means for returning said arm in a reverse direction to its original position.

3. A box assembly machine comprising a frame, a rotatable table carried by said frame, means for rotating said table in one direction, a plurality of work receiving forms carried by said table in peripherally spaced relation, an arm carried by said frame for oscillation coaxially with said table, said arm being disposed above and radially relative to said table, a pressure foot carried for vertical movement at the free end of said arm, an abutment member carried by said table adjacent each of said forms, a driving member carried movably by said arm and disposed normally in the path of said abutment members, whereby said arm is turned by the rotation of said table, said abutment members being so disposed relative to said forms that each positions said foot in registered relation above the associated form, means operable by the rotation of said table as said arm is turned therewith to depress said foot against said form, means operable by the further rotation of said table to elevate said foot and to move said driving member out of the path of said abutment members, and resilient means operable to return said arm in a reverse direction.

4. A box assembly machine comprising a frame, a rotatable table carried by said frame, means for rotating said table in one direction, a plurality of work receiving forms carried by said table in peripherally spaced relation, an arm carried by said frame for oscillation coaxially with said table, said arm being disposed above and radially relative to said table, a pressure foot carried for vertical movement at the free end of said arm, a releasable driving connection to said arm whereby said arm is caused to turn with said table through a partial revolution with said pressure foot in registered relation above one of said forms, means operable by the rotation of said table as said arm turns therewith to move said foot downwardly against said form, means operable by the rotation of said table to simultaneously elevate said foot and release the driving connection to said arm, resilient means urging said arm in a reverse direction to return it to its original position, and means for cushioning and regulating the return stroke of said arm.

5. A box assembly machine comprising a fixed vertical standard, a horizontal table carried concentrically on said standard for rotation thereabout, means for rotating said table continuously in one direction, a series of work receiving forms fixed on said table in peripherally spaced relation, an arm carried for axial oscillation on said standard above said table and extending radially thereto, a pressure foot carried for vertical movement at the outer end of said arm, a spring urging said arm pivotally in a direction reverse to the rotation of said table, a releasable driving connection between said table and said arm whereby said arm is turned in the direction of rotation of said table with said pressure foot in registered relation above any one of said work receiving forms, a cam carried rotatably on said standard and having a plurality of radial lobes corresponding in number and angular disposition to said forms, a ratchet securing said cam against rotation in the same direction as said table, said ratchet having teeth corresponding in number and angular disposition to said lobes, a cam follower carried by said arm and engaging said cam, means operable by said cam follower to urge said foot downwardly against said form as said arm turns with said table, resilient means urging said foot upwardly and said cam follower against said cam, whereby said foot is elevated when said follower passes over a cam lobe, and means operable by the rotation of said table to simultaneously release the driving connection to said arm, whereupon said spring moves said arm in a reverse direction to its original position, said cam ratcheting on said standard during said return stroke.

ROBERT E. SWISHER.

References Cited in the file of this patent
UNITED STATES PATENTS

| Number | Name | Date |
|---|---|---|
| 877,891 | Horton | Jan. 28, 1908 |
| 2,238,256 | Engel | Apr. 15, 1941 |
| 2,316,867 | Howard | Apr. 20, 1943 |